United States Patent [19]

Bogan et al.

[11] Patent Number: 5,945,168
[45] Date of Patent: Aug. 31, 1999

[54] SET MODIFYING ADMIXTURES FOR REFRACTORY SHOTCRETING

[76] Inventors: Jeffrey E. Bogan, 112 Kuhns La.;
Samuel B. Bonsall, III, 2110 Brushwood Dr., both of State College, Pa. 16801

[21] Appl. No.: 08/807,386

[22] Filed: Feb. 27, 1997

[51] Int. Cl.$^6$ ...................................................... B05D 1/02
[52] U.S. Cl. ........................... 427/427; 427/421; 427/426
[58] Field of Search ............................. 106/692; 427/421, 427/426, 427

[56] References Cited

U.S. PATENT DOCUMENTS

| | | | |
|---|---|---|---|
| 3,664,854 | 5/1972 | Kokuta | 106/90 |
| 3,741,308 | 6/1973 | Veley | 166/292 |
| 3,876,005 | 4/1975 | Fincher et al. | 166/292 |
| 4,003,965 | 1/1977 | Birum | 260/932 |
| 4,088,502 | 5/1978 | La Bar | 106/64 |
| 4,227,932 | 10/1980 | Leah et al. | 106/84 |
| 4,315,657 | 2/1982 | Burton, III | 299/2 |
| 4,444,555 | 4/1984 | Edwardsen et al. | 432/30 |
| 4,444,593 | 4/1984 | Schutz | 106/89 |
| 4,484,423 | 11/1984 | McClure, Jr. | 52/167 |
| 4,534,795 | 8/1985 | Lewis et al. | 106/89 |
| 4,623,393 | 11/1986 | Toda et al. | 106/38.22 |
| 4,728,358 | 3/1988 | Hoffman et al. | 75/0.5 R |
| 4,751,204 | 6/1988 | Kyoden et al. | 501/89 |
| 4,780,754 | 10/1988 | Liutkus et al. | 357/80 |
| 4,915,740 | 4/1990 | Sakai et al. | 106/104 |
| 4,921,536 | 5/1990 | Rechter | 106/74 |
| 4,956,013 | 9/1990 | Motoki | 106/675 |
| 5,180,698 | 1/1993 | Merzhanov et al. | 501/132 |
| 5,203,629 | 4/1993 | Valle et al. | 366/2 |
| 5,269,845 | 12/1993 | Grunay et al. | 106/692 |
| 5,275,655 | 1/1994 | Grunau et al. | 106/692 |
| 5,419,965 | 5/1995 | Hampson | 428/397 |
| 5,488,991 | 2/1996 | Cowan et al. | 166/293 |
| 5,512,325 | 4/1996 | Langenohl et al. | 427/421 |
| 5,512,523 | 4/1996 | Ono et al. | 106/692 |
| 5,549,745 | 8/1996 | Langenohl et al. | 106/692 |
| 5,603,759 | 2/1997 | Burkhart | 106/692 |
| 5,628,940 | 5/1997 | Allison | 264/30 |

*Primary Examiner*—Shrive Beck
*Assistant Examiner*—Michael Barr
*Attorney, Agent, or Firm*—Mark Kusner

[57] ABSTRACT

A method of applying a refractory castable material to the surface of a structure comprising the steps of thoroughly mixing a refractory castable material comprised primarily of aggregate and a cementitious binder; conveying the refractory material under pressure through a delivery hose to a dispensing nozzle; and adding hydrated lime to the refractory castable material prior to application by the nozzle.

10 Claims, No Drawings

SET MODIFYING ADMIXTURES FOR REFRACTORY SHOTCRETING

FIELD OF THE INVENTION

The present invention relates generally to shotcreting installation and processes, and more particularly to set modifying admixtures for refractory shotcreting. The invention is particularly applicable to shotcreting blast furnace trough castables and will be described with reference thereto, it being understood, however, that the present invention has applications shotcreting in other refractory castables.

BACKGROUND OF THE INVENTION

In recent years, refractory shotcreting has become a major method of installation for lining all types of refractory surfaces and for repair and maintenance of linings in steel, non-ferrous metal, chemical, mineral and ceramic processing plants.

Shotcreting is usually classified according to the process used, i.e., wet-mix or dry-mix spraying. A wet-mix refractory shotcrete process generally consists of thoroughly mixing a refractory material and water to produce a pumpable mixture. The mixture is then introduced into a delivery hose, and moved by pumping or conveying by compressed air to a dispensing (i.e., spraying) nozzle. A dry-mix refractory shotcrete process generally consists of mixing and conveying through the delivery hose the dry constituents of the refractory, and then introducing water under pressure at the nozzle prior to application of the refractory to the target surface.

In both processes, an admixture is typically added to the refractory castable at the nozzle. The admixture is a material that is used as an ingredient to initiate and accelerate the thickening and setting of the refractory castable so that it will not slump or sag when applied to vertical or overhead surfaces. Specifically, the admixture is a set-controlling material, commonly referred to as an "accelerator," that decreases the time required for the refractory to stiffen. In this respect, accelerators are generally used to speed tip the rate of stiffening of the refractory castable.

Sodium silicate is a conventionally known accelerator used in shotcreting processes. Sodium silicate provides very rapid acceleration of the setting of most cementitious materials and finds advantageous application in many types of refractory castables. However, in some refractory applications, and with some refractory castables, sodium silicate provides less than desirable results when used as an accelerant in a shotcreting process. In one respect, the rapid setting does not allow for surface shaping or contouring of the refractory, in that it basically hardens on contact. In another respect, the rapid setting produced by sodium silicate in some applications (i.e., with some materials or for some uses) is actually too rapid and results in a layered or stratified refractory lining. As the sodium silicate accelerated cementitious material is sprayed onto a surface, it basically sets when it hits the surface producing a thin layer of refractory. Subsequent passes (spraying) over this area puts another layer over the first layer, building up the refractory in layers with each subsequent pass. Basically, each layer is only loosely bonded to adjacent layers, thereby producing a material having poor matrix integrity.

In some instances, such a structure is adequate for the desired application. In other situations and applications, however, such a material is less than satisfactory. One situation, for example, is in shotcreting blast furnace trough castables. Refractory blast furnace trough castables must be capable of withstanding high temperatures, resist mechanical erosion and slag corrosion. Trough castables are typically low cement refractory materials composed primarily of a high alumina aggregate (brown fused alumina or bauxite, for example) and silicon carbide. A low cement level is used to minimize the reaction with blast furnace slags. In this respect, slag reacts with the lime in the cement, thus corroding the refractory lining. The high alumina aggregate and silicon carbide help resist attack from blast furnace slags. The silicon carbide also acts as an antioxidant and a volume stabilizer. Blast furnace trough castables also typically include other materials such as carbon, cement, fine aluminas and/or silicas or metals. The carbon is a non-wetting compound to iron and slag, and increases the thermal conductivity of the castable thus providing better thermal shock resistance to the castable. The fine aluminas and silicas help promote good flow properties, corrosion resistance and hot strength. Metals are added as antioxidants to protect, to aid in dryout and to enhance the strength.

Examples of castable refractory compositions suitable for wet-process shotcreting of blast furnace troughs include North American Refractories Company SHOTKASTTRW™, SHOTKASTTRC-SR™, SHOTKASTTRC-OR™, SHOTKAST TRC™ and SHOTKAST XZR-IR™ refractories. All of these mixtures are based on high alumina aggregate and silicon carbide compositions with varying amounts of carbon, cement, fine aluminas, fine silicas, metals and dispersing agents.

When sodium silicate is used with a low cement blast furnace trough castable, it provides very rapid setting of the refractory castable, as indicated above. In fact, the acceleration is too fast and does not allow sufficient time for layers of the sprayed material to "knit" (i.e., bond) together as it is being applied. This lack of knitting results in a laminated lining and a weakened structure not well suited for the high temperature and corrosive environment of a blast furnace. In other words, sodium silicate accelerated castable systems provide poor matrix integrity. In addition, the quick setting of the low cement refractory castable, when sodium silicate is used, does not allow for any surface scraping or contouring to be done after installation; the material simply hardens too quickly.

It is therefore thus desirable to provide an admixture which will not adversely affect the properties and characteristics of refractory castables, yet will allow shotcreting of refractory castables.

The present invention provides an admixture for use in a shotcreting process of refractory castable which prevents slumping or sagging of the refractory castable, and at the same time, allows "knitting" of sprayed layers of the refractory.

SUMMARY OF THE INVENTION

In accordance with one aspect of the present invention, there is provided a method of applying a refractory castable to the surface of a structure comprising the steps of: thoroughly mixing a refractory castable comprised primarily of aggregate and a cementitious binder; conveying the refractory castable under pressure through a delivery hose to a dispensing nozzle for applying the refractory castable; and adding hydrated lime to the refractory castable prior to application by the nozzle at a rate wherein the hydrated lime comprises less than 0.40% by weight of the refractory castable applied by the dispensing nozzle.

In accordance with another aspect of the present invention, there is provided a method of applying a low cement refractory castable to the surface of a structure comprising the steps of:

a) preparing an intimately mixed castable for application onto the surface of a structure, said refractory castable including by weight the following components:
about 45 to 70% high alumina aggregate,
about 0 to 35% silicon carbide, and
about 2 to 6% calcium aluminate cement;

b) conveying said refractory castable under pressure through a delivery hose to a dispensing nozzle for applying said refractory castable; and c) adding hydrated lime to said refractory castable prior to application by said nozzle at a rate wherein said hydrated lime comprises approximately 0.02 to 0.40% by weight of the refractory castable applied by the dispensing nozzle.

It is an object of the present invention to provide a set modifying admixture for use in a refractory shotcreting process.

Another object of the present invention is to provide a set modifying admixture particularly applicable for low cement refractory castables.

Another object of the present invention is to provide a set modifying admixture of the type described above which reduces the fluidity of a refractory without rapidly setting the refractory.

Another object of the present invention is to provide a set modifying admixture as described above which allows for the "knitting" of sprayed layers of a refractory castable as it is installed, and further allows for surface contouring or forming after its installation.

A still further object of the present invention is to provide a set modifying admixture as described above which improves the spraying characteristics of a refractory.

A still further object of the present invention is to provide a set modifying admixture as described above which minimizes deleterious materials to the refractory system.

A still further object of the invention is to provide a set modifying admixture as described above which provides beneficial transient shotcreting properties to a refractory material and which produces minimal impact on the long-term, steady-state properties and service performance of the refractory material.

These and other objects of the invention will become apparent from the following description of preferred embodiments and the appended claims.

DETAILED DESCRIPTION OF THE PREFERRED EMBODIMENT

The present invention relates generally to shotcreting processes, and more particularly to an admixture to be added to a refractory used in a shotcreting system to prevent slumping and sagging of the refractory castable when applied. As used herein, the term "shotcreting" is intended to include both wet-mix and dry-mix processes. The preferred embodiment of the present invention will be described with respect to wet-mix shotcreting of a low-cement refractory, more specifically a blast furnace trough castable. However, as will be appreciated from a further reading of the specification, the present invention finds advantageous application with both wet-mix and dry-mix shotcreting, and may be used in shotcreting higher cement refractories.

As indicated above, blast furnace trough castables are generally low cement refractories. Such refractories contain calcium aluminate cement, but are composed primarily of a high alumina aggregate (brown fused alumina or bauxite, for example) and silicon carbide. The high alumina aggregate and silicon carbide help resist attack from blast furnace slags. The silicon carbide also acts as an antioxidant and a volume stabilizer. The blast furnace castable also generally includes other material to enhance the flow properties and operating properties of the refractory. For example, blast furnace trough castables may also contain carbon, cement, fine aluminas and/or silicas or metals. The carbon is a non-wetting compound to iron and slag, and increases the thermal conductivity of the castable thus providing better thermal shock resistance to the castable. The fine aluminas and silicas help promote good flow properties, corrosion resistance and hot strength. Metals are typically added as antioxidants as dryout aids and as strength enhancers.

Examples of low cement castable refractory compositions suitable for wet-process shotcreting of blast furnace troughs include North American Refractories Company SHOTKASTTRW™, SHOTKASTTRC-SR™, SHOTKASTTRC-OR™, SHOTKAST TRC™ and SHOTKAST XZR-IR™ refractories. All of these mixtures are based on high alumina aggregate and silicon carbide compositions with varying amounts of carbon, cement, fine aluminas, fine silicas, metals and dispersing agents. The alumina aggregate has an alumina content greater than or equal to about 40% by weight. The alumina aggregate preferably includes one or more materials selected from the group consisting of brown fused alumina, tabular alumina, white fused alumina, calcined bauxite, mullite and magnesia-aluminate spinel.

Broadly stated, the present invention relates to a method of applying a refractory material to a surface of a structure. According to the present invention, a refractory material comprised of aggregate and a cementitious binder are thoroughly mixed and conveyed to a dispensing nozzle via a delivery hose. In a wet-mix process, sufficient water is added to the aggregate and cementitious binder to produce a material suitable for pumping through the delivery hose. In a dry-mix process, the mixed aggregate and binder are fed into the delivery hose and carried by compressed air to the nozzle where the water is added and mixed with the refractory.

Apparatus for mixing and conveying the refractory materials to the delivery nozzle, as well as the delivery nozzle itself are conventionally known, and such components in and of themselves form part of the present invention only to the extent they are necessary in carrying out the claimed processes. Apparatus of this type are shown in an American Concrete Institute Committee Report No. 506 entitled "Guide To Shotcrete" dated Aug. 1991.

With respect to the refractory to be applied, the composition of such material will, of course, be based upon the specific application and environment to which it will be exposed, and to a certain extent the composition will be modified to lend itself to shotcreting, either by a wet-mix or a dry-mix technique. In this respect, refractories used with a wet process shotcreting technique must have suitable flow properties for pumping (i.e., the grain size may be modified so that the mix can be pumped through a line that is constricted). Likewise, in a dry-mix shotcrete process, the composition of the material may have to be modified to facilitate feeding to, and movement through, the delivery hose. Further, the bond system (combination of cement, sub-micron particles and dispersant/retarders) is generally designed to lose fluidity quickly when combined with a set modifying admixture. It is believed that the present invention is applicable for use with most any type of refractory castable suitable for shotcreting.

According to the present invention, a specific set modifying admixture is added to the refractory aggregate. This set modifying admixture furnishes beneficial, transient properties to the refractory material. With respect to the set modifying admixture, it is important to minimize the impact such material may have to the long-term, steady-state physical and chemical properties and service performance of the engineered, refractory systems. In this respect, these refractory systems, especially low cement refractories such as blast furnace trough castables, are designed for high temperature use in a corrosive environment. These refractory systems are specifically designed for particular applications and environments, and include specific materials to meet such requirements. The addition of unwanted, deleterious chemicals may adversely affect the desired ultimate, chemical and physical properties of the refractory system. Thus, it is highly desirable to minimize any deleterious material added to the refractory material by the set modifying admixture.

According to the present invention, hydrated lime (Ca(OH)$_2$), formed by the slaking of quick lime, is added as a set modifying admixture to a refractory castable in a shotcreting process just prior to applying (i.e., spraying) the refractory castable. More specifically, a hydrated lime solution is added to the refractory at the dispensing nozzle by a conventional metering device. The solution is fed to the nozzle, preferably by a conventional, adjustable metering pump, to match the flow of refractory from the nozzle. Metering pumps of this type are conventionally known and arrangements of dispensing nozzles and admixture feed lines are also disclosed in the aforementioned American Concrete Institute Report No. 506. On information and belief, the addition of the hydrated lime Ca(OH)$_2$ admixture initiates quick-forming chemical bonds that transform the cementitious material into a gel-like state providing body and substance to the refractory castable. In this respect, it is believed that the use of the hydrated lime does not act so much as a set accelerating substance, but rather coagulates the cementitious material to a gelatinous mass enabling shotcreting of the refractory, i.e., preventing slumping or sagging.

The hydrated lime is preferably used in solutions ranging from approximately 9:1 (i.e., 9 parts water to 1 part hydrated lime) to 1:1 (1 part water to 1 part hydrated lime), and more preferably, in solutions ranging from 4:1 to 2:1. The most preferred concentration of the set modifying admixture is 4:1 because less additional hydrated lime (Ca(OH)$_2$) is added to the refractory castable. The optimum amount of hydrated lime to be added may be less, and is preferably the minimum amount required to prevent slumping. This amount may vary depending upon the ambient temperature and how much modifier was added to the castable to make it pumpable. It will be appreciated that the water is simply used as a vehicle to infuse the hydrated lime into the refractory castable.

Stated another way, i.e., by gallons/ton, the amount of the set modifying admixture solution required per ton of refractory may range from between 0.5 and 2 gallons per ton of castable refractory, the preferred amount being 1 gallon per ton. The preferred ranges of the set modifying admixture (as an addition of the chemical to the refractory on a dry basis) is 0.02 to 0.20% by weight (the 4 to 1, water to hydrated lime mixture added at 1 gallon per ton of refractory would be approximately 0.10% by weight hydrated lime to refractory on a dry basis).

The invention shall now be further described together with the following example showing a comparison of hydrated lime and sodium silicate as set modifying admixtures when shotcreting a like refractory castable. The following example and test results are set forth for illustration only. Proportions are set forth in wt. % unless otherwise indicated.

EXAMPLE I

A test is conducted to compare the effect and results of three (3) separate set modifying admixtures when used in a shotcreting process using a specific low cement refractory.

The refractory used in the test is a blast furnace trough castable of the following composition.

| Trough Castable Refractory (as described above) Material (particle size) | % Weight |
|---|---|
| Brown Fused Alumina Grain (3 mesh) | 62.35 |
| Calcined Alumina (325 mesh) | 7.5 |
| Silicon Carbide, Fine (200 mesh) | 16 |
| Microsilica | 4 |
| Carbon Black | 2 |
| Calcium Aluminate Cement | 4 |
| Raw Kyanite (35 mesh) | 1.25 |
| Dispersant-Condensed sulfonated naphthalene salt | 0.15 |
| Retarder-citric acid | 0.01 |
| Silicon metal (200 mesh) | 2.5 |
| Polypropylene Fibers | 0.08 |

The refractory may be prepared as a wet-mix using conventionally known mixers (i.e., paddle or continuous mixers). It is found that the use of hydrated lime, when used with this refractory material, provides a refractory having superior physical properties than like materials using a sodium silicate accelerant. Table II shows test results for a shotcrete refractory material illustrating improved characteristics of the resultant refractory material when hydrated lime is used.

The shotcreting of the foregoing refractory castable is conducted with the admixture pump at a "2.8" setting which equates to approximately 12 gallons per hour. At an estimated 10 tons per hour, refractory castable output at the dispensing nozzle would convert to 1.2 gallons per ton of refractory for each admixture. Table I sets forth the percentage based upon the different densities and concentrations.

TABLE I

| Refractory | Trough Castable Refractory (as described above) | | |
|---|---|---|---|
| Sample No. | 1 | 2 | 3 |
| Admixture | Sodium Silicate (44.1% solution in water) | Hydrated Lime (20% in solution in water) | 20% Hydrated Lime + 20% Calcium Chloride in water |
| Density, lb/gal | 12.8 | 9.2 | 10.4 |

TABLE I-continued

| Refractory | Trough Castable Refractory (as described above) | | |
|---|---|---|---|
| Sample No. | 1 | 2 | 3 |
| Wt % addition at 1.2 gal per ton rate | 0.77% | 0.55% | 0.62% |
| Wt % addition (dry basis) | 0.34% | 0.11% | 0.25% |

Samples of each of the resultant set refractories are tested and the resultant properties are set forth in Table II.

TABLE II

| Refractory | Trough Castable Refractory (as described above) | | |
|---|---|---|---|
| Sample No. | 1 | 2 | 3 |
| 230° F. Density (pcf) | 174.2 | 176 | 176 |
| Set Time on Wall | Immediate | 40 minutes | 5 minutes |
| 230° F. Porosity (%) | 17.5 | 16.3 | 16.6 |
| 230° F. MOR (psi) | 400 | 1380 | 1240 |
| 2500° F. Hot MOR (psi) | 250 | 430 | 430 |
| Slag Corrosion (6 hours @ 2850° F.) | | | |
| Corroded Area (in$^2$) | 0.55 | 0.42 | 0.40 |
| Relative Index | 1.00 | 0.76 | 0.73 |

As shown in Table II, the use of hydrated lime alone, or together with a small amount of calcium chloride, produces a set refractory having a substantially higher modulus of rupture (MOR) at 230° F. and at 2500° F. as contrasted to the same refractory material sprayed using sodium silicate as an accelerant. The set refractory also shows an improved corrosion resistance as contrasted to the same material sprayed using sodium silicate as an accelerator.

The test results indicate that the sodium silicate produces generally an immediate setting of the refractory material. Use of hydrated lime as an accelerant produces setting of the refractory material in approximately 40 minutes. When the hydrated lime is used with calcium chloride, setting of the refractory occurs in approximately 5 minutes. Importantly, while the use of hydrated lime delays the setting of the refractory material relative to a sodium silicate accelerant, the resultant material has a substantially increased strength and a more uniform monolithic structure. In this respect, it is believed that the longer setting time of the refractory allows a "knitting" of the sprayed layers of refractory, thereby producing a more uniform material as contrasted to the striations or layered effects produced by spraying refractory castable using sodium silicate as an accelerating agent. With respect to the latter admixture, the immediate setting of the refractory castable using sodium silicate as an accelerant generally produces a layered effect as the material is sprayed onto a surface, layer upon layer. This spraying of layer upon layer of refractory which quickly sets produces a onion-skin type structure, which ultimately affects the strength of the refractory lining.

In addition to providing a material which sets more slowly and allows for knitting of the sprayed layers, the hydrated lime admixture facilitates more uniform spraying of the refractory castables as contrasted to similar refractories using sodium silicate as an admixture. In this respect, because of the rapid setting of the refractory castable when sodium silicate is used, the refractory castable tends to agglomerate or clump while being jetted from the dispensing nozzle. This results in spraying of globs of material which, when impacting on the surface to be coated, creates uneven layers which only accentuate the lack of knitting discussed heretofore. Refractory castable using hydrated lime, however, appears to have a more uniform texture and provides a more even spraying of the refractory.

Still further, the use of hydrated lime has an additional advantage of introducing less admixture into the refractory matrix. In this respect, as shown in Table I, on a dry weight basis percentage, only 0.11% of hydrated lime is required to provide a shotcreted refractory material. In comparison, 0.34% by weight of sodium silicate is required to be added to the refractory castable to produce a shotcretable material. In this respect, the greater the amount of admixture added to the refractory, the greater the amount of residual material found in the set refractory which may affect the properties thereof Table III shows an analysis of samples showing the increased amounts of sodium and calcium found in the resultant refractory as a result of the use of sodium silicate, hydrated lime and hydrated lime plus calcium chloride.

The aforementioned indicate the benefit and uniqueness of using the hydrated lime accelerator in blast furnace trough castables compared to the sodium silicate accelerator.

TABLE III

| | Chemical Analysis | | | |
|---|---|---|---|---|
| Sample No. | Control (Lab cast) | 1 | 2 | 3 |
| Admixture | None | Sodium Silicate | Hydrated Lime | Hydrated Lime & Calcium Chloride |
| Na$_2$O | 0.08% | 0.16% | | |
| CaO | 1.37% | | 1.29% | 1.38% |

Table III basically shows that for all practical purposes, no measurable addition of calcium is seen in the refractory when using the hydrated lime or hydrated lime and calcium chloride as a set modifying admixture. On the other hand, the refractory using sodium silicate shows a doubling of the residual sodium oxide in the refractory sample as contrasted to a controlled lab casting of the same refractory castable.

In one respect, both calcium oxide (CaO) and sodium oxide (Na$_2$O) are fluxing agents that, based on the amounts present, reduce the use temperature of the finally-cured refractory system. In low cement refractories, calcium oxide will be present in greater amounts than sodium oxide because of the use of calcium aluminate as the cementitious binder. The addition of hydrated lime, in accordance with the present invention, does not significantly increase the amount of calcium oxide already present in a calcium aluminate cement containing refractory castable. However, the use of sodium silicate as a set modifying admixture significantly increases the concentration of sodium oxide that may be found in the refractory material (see Table III). Inasmuch as sodium oxide is a more chemically reactive material and is a stronger fluxing agent than calcium oxide, the addition of even small amounts of sodium oxides (through use of sodium silicate as a set modifying admixture) into the refractory system has a detrimental effect on the final physical and chemical properties of the set refractory. Thus, within the scope of the present invention, in addition to providing the non-slumping and non-sagging characteristics necessary for shotcreting refractories, use of hydrated lime adds a lesser amount on a weight basis of a less detrimental material to the refractory system, thereby minimizing any detrimental effects an admixture may have thereon.

The foregoing example illustrates the use of hydrated lime as an admixture with a conventional "trough castable," the term "trough castable" being conventionally understood by those skilled in the art. The following example illustrates the use of hydrated lime as an admixture with a different type of castable.

EXAMPLE II

A test is conducted to examine the effect and results when sodium silicate and hydrated lime are used as set modifying admixtures in a shotcreting process using an 80% alumina castable.

The refractory used in the test has the following composition:

| 80% Alumina Castable Refractory Material (particle size) | % Weight |
|---|---|
| Calcined Bauxite (6 mesh) | 55 |
| Raw Kyanite (35 mesh) | 13.25 |
| Fine Alumina (325 mesh) | 21.75 |
| Microsilica | 6 |
| Calcium Aluminate Cement | 4 |
| Dispersant-Condensed sulfonated naphthalene salt | 0.15 |
| Retarder-citric acid | 0.1 |
| Polypropylene Fibers | 0.08 |

The refractory is prepared as a wet mix using conventionally known mixers (i.e., paddle or continuous mixers). The shotcreting of the foregoing refractory castable is conducted with the admixture pump at a setting required to effectively eliminate slumping on a vertical wall. Although the rate was not directly measured, the admixture pump was at a higher setting for the sodium silicate solution, approximately twice the addition rate.

Samples of each of the resultant set refractories are tested and the resultant properties are set forth in Table IV.

TABLE IV

| Refractory | 80% Alumina Castable Refractory (as described above) | | |
|---|---|---|---|
| Sample No. | Control/Lab Cast | 1 | 2 |
| Admixture | None | Sodium Silicate | Hydrated Lime |
| 230° F. Density (pcf) | 171.1 | 165.4 | 169.2 |
| 230° F. Porosity (%) | 17.9 | 21 | 18.8 |
| 230° F. MOR (psi) | 1680 | 1000 | 2330 |
| 230° F. CCS (psi) | 5960 | 3830 | 7670 |
| 2500° F. Hot MOR (psi) | 1050 | 660 | 900 |

It is found that use of hydrated lime with the 80% alumina castable refractory provides a refractory material having superior physical properties than the same castable using a sodium silicate accelerator. At 230° F., the castable sprayed with the hydrated lime had a modulus of rupture (MOR) substantially higher than the same material sprayed with sodium silicate, and even higher than the cast control sample. At 2500° F., the modulus of rupture (MOR) of the castable sprayed with the hydrated lime was less than the control cast sample, but considerably greater than the same material sprayed with sodium silicate.

TABLE V

| | Chemical Analysis | | |
|---|---|---|---|
| Sample No. | Control (Lab cast) | 1 | 2 |
| Admixture | None | Sodium Silicate (33% solution in water by volume) | Hydrated Lime (20% solution in water) |
| Na₂O | 0.07% | 0.14% | |
| CaO | 1.10% | | 1.2% |

Table V basically shows that for all practical purposes, no measurable addition of calcium is seen in the refractory when using the hydrated lime as a set modifying admixture. On the other hand, the refractory using sodium silicate shows a doubling of the residual sodium oxide in the refractory sample as contrasted to a controlled lab casting of the same refractory castable. Thus, the use of hydrated lime as a set modifying admixture introduces a lesser amount, on a weight basis, of a detrimental material to the refractory system (as contrasted with sodium silicate), yet provides a set refractory having superior physical properties.

The present invention thus provides a hydrated lime admixture for use in shotcreting a refractory castable that prevents sagging and slumping of the sprayed refractory castable, but at the same time, has a set time long enough to allow the sprayed layers of refractory material to "knit" together and join into one monolithic structure, thereby providing increased strength over systems known heretofore. Hydrated lime also reduces the amount of admixture (compared to sodium silicate) required to prevent sagging and slumping, thereby producing a refractory with less fluxing reside and one which is easier to apply.

The present invention has been described with respect to preferred embodiments. Modifications and alterations will occur to others upon a reading and understanding of the specification. For example, while the foregoing Tables disclose the use of hydrated lime individually or with small amounts of calcium chloride, it is believed that other soluble alkaline compounds, such as magnesium chloride, calcium nitrate, magnesium sulfate and the like, may work equally as well when used with hydrated lime as an admixture with low cement castable refractories. In addition, although the examples show use of hydrated lime in a wet-mix process, it is believed that the same benefits and advantages are attainable by using hydrated lime solutions as admixtures in a dry-mix process. It is intended that all such modifications and alterations be included insofar as they come within the scope of the patent as claimed or the equivalents thereof.

Having described the invention, the following is claimed:

1. A method of applying a refractory trough castable to the surface of a refractory structure, comprising the steps of:
   a) preparing an intimately mixed trough castable for application onto the surface of a refractory structure, said refractory castable including by weight the following components:
      about 45 to 70% alumina aggregate selected from the group consisting of brown fused alumina, tabular alumina, white fused alumina, calcined bauxite, mullite and magnesia-aluminate spinel, said alumina aggregate having an alumina content greater than or equal to about 40% by weight, about 5 to 35% silicon carbide, and about 2 to 6% calcium aluminate cement;

b) conveying said refractory trough castable under pressure through a delivery hose to a dispensing nozzle for applying said refractory trough castable; and c) adding a sodium silicate-free admixture comprised of equal amounts of hydrated lime and calcium chloride to said refractory trough castable prior to application by said nozzle at a rate wherein said hydrated lime and said calcium chloride each comprise about 0.02 to 0.40% by weight of the refractory trough castable applied by said dispensing nozzle.

2. A method as defined in claim 1, wherein said refractory castable includes fine aluminas, fine silicas and dispersing agents.

3. A method as defined in claim 2 wherein said refractory castable includes carbon.

4. A method as defined in claim 2, wherein said refractory castable includes metals.

5. A method as defined in claim 1, wherein said refractory castable is conveyed through said delivery hose as a wet mix.

6. A method as defined in claim 1, wherein said refractory castable is conveyed through said delivery hose as a dry mix and water is added to said dry mix with said hydrated lime.

7. A method as defined in claim 1, wherein said hydrated lime is in suspension having a water to hydrated lime concentration of about between 1:1 and 9:1.

8. A method of applying a refractory castable to the surface of a structure, comprising the steps of:

thoroughly mixing a refractory material having an alumina content of 70% or greater, said refractory material comprised primarily of:

about 45 to 70% alumina aggregate selected from the group consisting of brown fused alumina, tabular alumina, white fused alumina, calcined bauxite, mullite and magnesia-aluminate spinel, about 21.75% or less of fine alumina and about 2 to 6% calcium aluminate cement;

conveying said refractory material under pressure through a delivery hose to a dispensing nozzle for applying said refractory material; and, adding a sodium silicate-free admixture comprised of equal amounts of hydrated lime and calcium chloride to said refractory material prior to application by said nozzle at a rate wherein said hydrated lime and said calcium chloride each comprise less than about 0.20% by weight of the refractory material applied by the dispensing nozzle.

9. A method as defined in claim 8, wherein said alumina material includes one or more materials selected from the group consisting of brown fused alumina, tabular alumina, white fused alumina, calcined bauxite, mullite and magnesia-aluminate spinel.

10. A method of applying a refractory castable to the surface of a structure, comprising the steps of:

thoroughly mixing a refractory material, said refractory material having an alumina content of at least 70% by weight and a calcium aluminate cement content of about 2% to 6%;

conveying said refractory material under pressure through a delivery hose to a dispensing nozzle for applying said refractory material; and, adding a sodium silicate-free set modifying admixture comprised of equal amounts of calcium chloride and hydrated lime to said refractory material prior to application by said nozzle at a rate wherein said admixture comprises less than about 0.40% by weight of the refractory material applied by the dispensing nozzle.

* * * * *